United States Patent [19]

Burdette et al.

[11] 4,138,903
[45] Feb. 13, 1979

[54] HYDROSTATIC TRANSMISSION CONTROL

[75] Inventors: Stephen D. Burdette, Bloomfield Hills, Mich.; Michael L. Wenning, Greensburg, Ind.

[73] Assignee: Massey-Ferguson Inc., Detroit, Mich.

[21] Appl. No.: 839,544

[22] Filed: Oct. 5, 1977

[51] Int. Cl.$^2$ ........................... G05G 7/00; G05G 5/04
[52] U.S. Cl. ..................................... 74/473 R; 74/526
[58] Field of Search .............. 74/471 XY, 473 R, 475, 74/477, 526

[56] References Cited
U.S. PATENT DOCUMENTS

| 3,458,018 | 7/1969 | Shore ........................................ 192/4 |
| 3,626,780 | 12/1971 | Lowder et al. ...................... 74/473 R |
| 3,795,157 | 3/1974 | Campbell ......................... 74/473 R X |
| 3,993,175 | 11/1976 | Beveridge ................... 74/471 XY X |

Primary Examiner—Allan D. Herrmann
Attorney, Agent, or Firm—William R. Nolte

[57] ABSTRACT

A hand control arrangement for a hydrostatic transmission having a single manually actuated control to vary the driving direction and speed of the transmission and wherein the movement of the hand control lever is limited to a predetermined path making it possible for the operator to sense various speed levels of the transmission.

11 Claims, 3 Drawing Figures

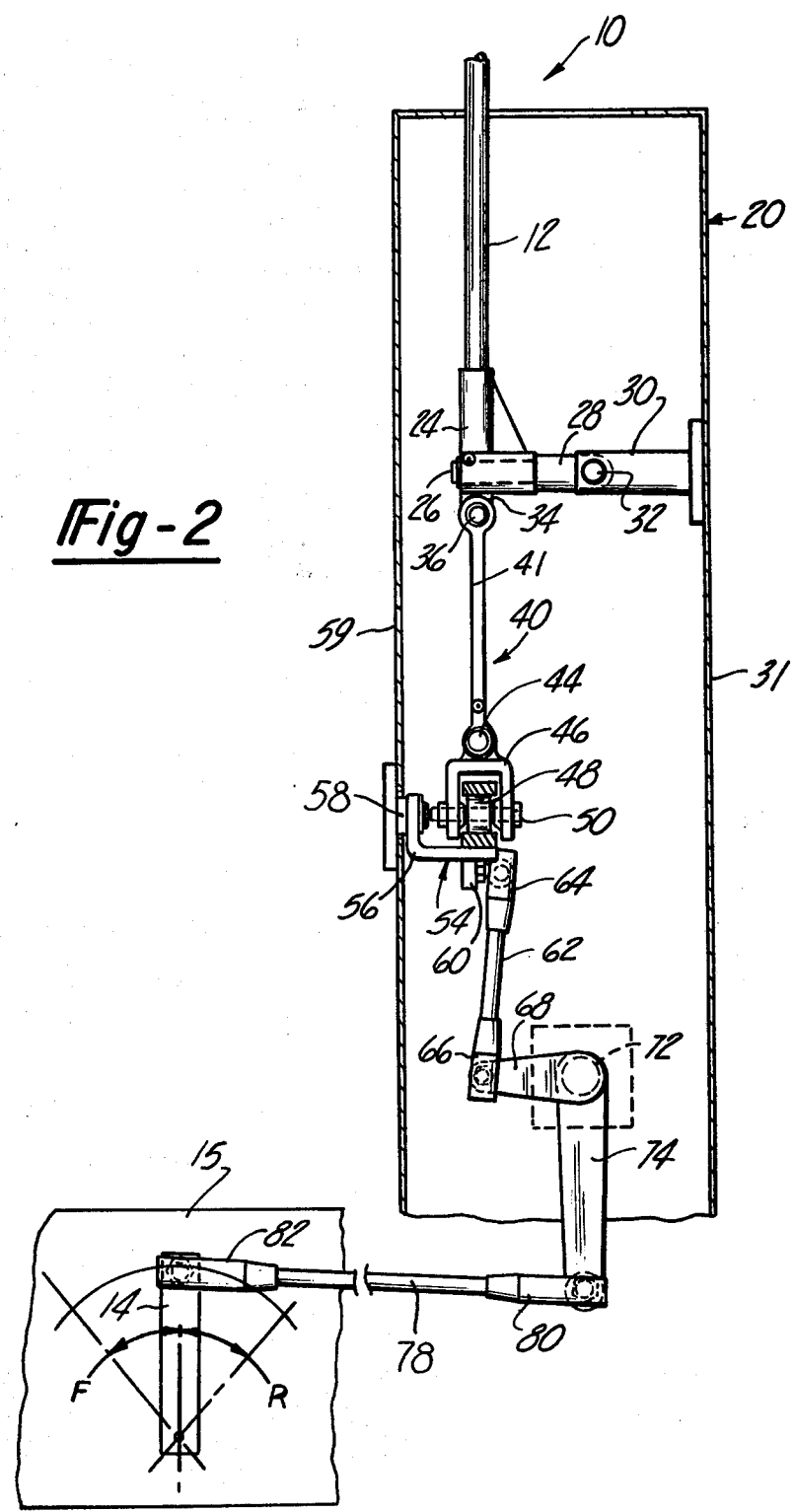

HYDROSTATIC TRANSMISSION CONTROL

This invention relates to control apparatus for a hydrostatic transmission and more particularly to a single manually actuated control for varying speed and changing driving direction of the transmission.

Track laying vehicles are commonly provided with control systems for steering by the use of a pair of foot operated pedals and the hands are used to simultaneously control speed of the vehicle, the forward and reverse movement of the vehicle and implements such as a bulldozer blade. Consequently it becomes necessary to combine some of the hand controlled functions such as speed control and direction control.

Hydrostatic transmissions afford infinite speed adjustment but a single lever manual control usually is not completely satisfactory to the operator because the load of the vehicle and of the implement both are variable and the combined load cannot be accurately sensed. As a result control requires the careful visual attention of the operator to the position of the controls.

It is an object of the invention to provide manually operated control mechanism for a hydrostatic transmission wherein both the direction movement of the vehicle and the speed of the vehicle can be controlled by a single lever.

Still another object of the invention is to provide a control mechanism for a hydrostatic transmission forming a single manually movable lever by which it is possible to achieve direction and speed change by an arrangement which makes it possible to sense the condition of the control without requiring visual attention.

Another object of the invention is to provide a control mechanism for a hydrostatic transmission in which the single lever control for effecting direction and speed change is guided in a predetermined path and wherein the position of the control lever in the path can easily be sensed by an operator.

The control apparatus of the invention includes a single lever which is connected by linkages to a control arm of a hydrostatic transmission in such a manner that transverse movement of the lever selects the direction of rotation of the transmission output and subsequent longitudinal movement of the lever determines the speed of the transmission output in either its selected forward or reverse driving range. The linkage arrangement includes an arcuate master control member which slidably receives one end of a control member, the movement of which determines the forward or reverse driving range but maintains a zero speed condition. Subsequent longitudinal movement of the control member swings the arcuate master control member to move the transmission control arm to either its forward or reverse drive range. The position of the control member relative to the arcuate master control member determines the maximum speed available from the transmission for that particular relative setting of the master control member and control member. Movement of the control member is brought about by a single hand operated lever whose movement is confined in a predetermined path so that the operator can sense the various speed levels which he is operating.

These and other objects of the invention will be apparent from the following description and from the drawings in which:

FIG. 2 is a side elevation of the control apparatus seen in FIG. 1; and

Figure 1:
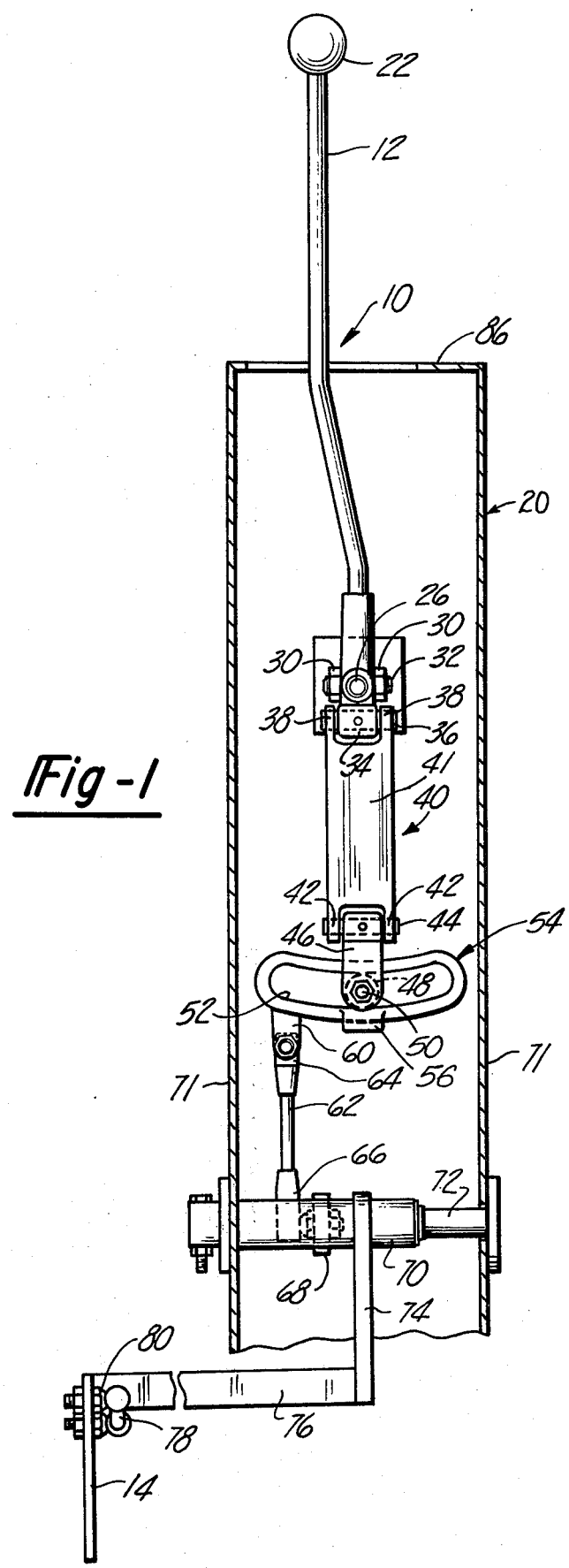
FIG. 1 is a rear elevation of the control apparatus embodying the invention with the control counsole supporting the apparatus shown in the cross section.

Referring to the drawings a hand operated control apparatus embodying the invention is indicated generally at 10 and includes a single lever 12 connected to a train of linkages to a control arm 14 forming part of a conventional hydrostatic transmission indicated at 15. The arm 14 is swingable in opposite directions from the neutral position in which it is illustrated to either a selected forward drive or reverse drive position. The magnitude of arcuate movement from the neutral position determines the output speed of the transmission and therefore the speed of movement of the vehicle. In operation, the engine of the vehicle is operated at a selected constant speed and the direction and speed of movement of the vehicle is under the control of the single lever 12 while steering is controlled by a pair of foot levers, not shown, but well known in the art.

The hand control lever 12 is supported relative to a console 20 so that the lever 12 extends above the console with an exposed knob or handle 22 formed at one end. The other end of the lever 12 is provided with a pivot bracket 24 which is disposed within the console 20. The pivot bracket 24 is supported on a shaft 26 projecting from a body member 28. The body member 28 is disposed between a pair of brackets 30 mounted on a wall 31 of the console 20 and is pivotally connected to the brackets 30 by a pin 32 having its axis extending transversely to the axis of the shaft 26. The shaft 26 and pin 32 form a mounting affording universal angular adjustment of the lever 12.

The pivot support 24 also is provided with a support portion 34 which holds a pin 36 in position to pivotally receive the upper ears 38 of a control member 40. The lower end of an arm 41 of the control member 40 has ears 42 pivotally supporting the opposite ends of a pin 44 on which a yoke 46 is mounted. The yoke 46 supports a roller 48 on an axle formed by a bolt 50 all of which are part of the control member 40. The roller 48 is permitted confined movement in an arcuate guide groove 52 formed in a shift element such as master control member 54 of FIG. 1. The guide groove 52 is arcuate and has the center of its radius located on the axis of the shaft 26 so that movement of the member 40 to either side from the position in which it is shown in FIG. 1 results in movement of the roller 48 in the guide groove 52. The master control member 54 is pivotally supported on the console 20 by means of a bracket 56 formed integrally with the master control member 54. The bracket 56 is pivotally mounted on a pin 58 rigidly mounted to a wall 59 of the console 20 and has its axis substantially in alignment with the axis of the axle 50 when the roller 48 is midway in the guide groove 52 as illustrated in FIG. 1.

The master control member 54 has a depending lug 60 which supports one end of a rod 62 through a ball joint 64. The lower end of the rod 62 also is provided with a ball joint 66 mounted on one end of a crank arm 68 rigidly connected to a tube 70 mounted for rotation on a shaft 72 extending transversely of the console 20 and supported in opposite walls 71. The swinging movement of the crank arm 68 also results in similar swinging movement of a longer control arm 74 also rigidly connected with the tube 70. The lower end of the arm 74 has a lateral extension 76, the outer end of which is pivotally connected to a regulating rod 78 through means of a ball joint 80 at one end. The other end of the rod 78 is also provided with a ball joint 82 connected to the control arm 14 for regulating the transmission.

Referring again to the control member 40 in FIG. 1, it will be noted that movement of the control lever 12 to the left or right about the shaft 26 will result in swinging movement of the control member 40 so that the roller moves in the guide groove 52. With the roller 48 in the position seen in FIG. 1, that is, in its neutral position midway between the ends of the groove 52 the control lever 12 cannot be moved about the axis of the pin 32 because the axle 50 of the roller 48 and the pivot pin 58 are in alignment so that the master control member 54 resists movement. However, if the control lever 12 is moved first to the right as viewed in FIG. 1, the control member 40 will swing about the axis of shaft 26 and move to the left in the guide groove 52, after which the control lever 12 may be moved clockwise about the pin 32 as viewed in FIG. 2. Such movement results in vertical upward movement of the control member 40 and as a result the master control member 54 will swing about the pivot 58. Similarly, with the roller 48 at the right end of the guide groove 52 as viewed in FIG. 1, vertical upward movement of the control member 40 will result in pivotal movement of the master control member 54 but in a direction opposite to that achieved when the roller 48 was in the left end of the guide groove 52.

Movement of the control member 40 in a vertical direction is prevented when the roller is disposed in the neutral position illustrated in FIG. 1 at which time the control lever 12 will be in its most forward position or vertical as viewed in FIG. 2. Movement of the lever 12 to either side of the neutral position as viewed in FIG. 1 determines the direction of rotation of the transmission output and the direction of drive of the vehicle. By way of example, if the lever 12 is moved to the right from the position seen in FIG. 1, pivotal movement occurs about the shaft 26 so that the member 40 swings to the left and moves the roller 48 into a control zone at the left end of the guide groove 52. After the roller has left its neutral position, the lever 12 can be moved rearwardly or clockwise about the axis of pin 32 as viewed in FIG. 2 so that the control member 40 moves upwardly and the master control member 54 pivots about pin 58 to move the rod 62 upwardly. Such movement is transferred through crank arms 68, 74 and the rod 78 to move the transmission control arm 14 from its neutral position into a forward drive range and the amount of angular movement from the neutral position determines the output speed of the transmission.

If the drive of the transmission is to be reversed from the forward drive position, the control member 40 must be moved so that the roller 48 is transferred from the left half of the guide groove 52 toward the right half of the guide groove 52 as viewed in FIG. 1. To accomplish this it is necessary to first move the master control member 54 to its normal position as shown in FIG. 1 so that the roller 48 can pass from the forward drive range at the left to the reverse drive range at the right of the guide groove. This requires that the control lever 12 be returned to its generally vertical position as seen in FIGS. 1 and 2 which results in pivoting of the master control member 54 to its generally horizontal position. Thereafter the control lever 12 may be moved from the forward drive range to the reverse drive range and the speed of the drive may be determined subsequently by swinging the lever rearwardly about the axis of pin 32.

The distance that the roller 48 is displaced from its neutral position in the slot 52 determines the maximum amount of pivoting of the master control member 54 and therefore the maximum speed which can be obtained. Maximum speed sittings can be accomplished when the roller is at its extreme left or right position shown in FIG. 1.

Figure 3:
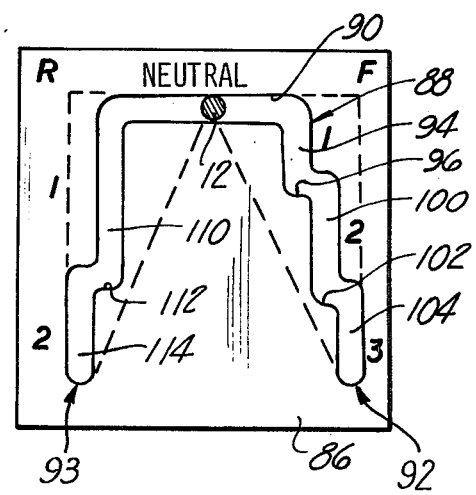
FIG. 3 is a top view of the control apparatus at a slightly enlarged scale.

To facilitate operation of the hand operated control system, the upper end of the console 20 is provided with a guide plate 86 best seen in FIG. 3 and which confines the movement of the lever 12. In the absence of the guide plate it would be possible to move the hand control lever 12 anywhere within the boundaries of the two generally triangular areas identified by broken lines in FIG. 3 and located at the left and at the right of the neutral position. Also, without the guide plate 86, the farther the lever 12 is moved to the left or to the right from its fully neutral position the greater the speed range that becomes available upon rearward movement of the lever 12. In other words, the maximum speed range that becomes available is directly proportional to the amount of movement of the lever 12 from its neutral point. However, the guide plate 86 is provided to confine the movement of the hand lever 12 so that it can be moved only in the predetermined path defined by a groove or guide slot 88. The guide slot 88 has a generally transverse path 90 which determines the neutral movement of the hand lever 12 at which time the transmission has zero speed output. Opposite ends of the neutral path 90 are intersected by a forward drive path 92 and a reverse drive path 93. The path 92 has a first forward speed range or path 94 which permits movement of the lever 12 rearwardly a limited amount until it engages a transverse step portion or gate 96 which requires slight transverse displacement of the lever 12 afterwhich the lever can be moved rearwardly in a second forward speed range or path 100 until the lever 12 encounters another step or gate 102. At the gate 102 movement of the little lever 12 is interupted and a slight additional transverse displacement to the right is required for alignment of the lever 12 with a third forward speed range or path 104 so that the lever 12 can be moved rearwardly an additional amount to increase the output speed. The first, second and third forward speed ranges permit an increase in transmission speed from a minimum to a maximum in three distinct steps or ranges.

The reverse drive guide path 93 allows movement of the hand control lever 12 in a first path or reverse speed range 110 and results in an increase in speed of the transmission from a minimum until the lever 12 encounters a step or gate 112 at which point slight transverse movement of the lever 12 is required to bring the lever into alignment with a second reverse speed range or path 114. Movement of the lever 12 in the reverse speed range 114 further increases the transmission speed from an intermediate to a maximum speed.

The guide plate 86 with the guide slot 88 makes it possible for an operator to manipulate the lever 12 without giving careful attention to the path of movement of the lever. The guide slot 88 not only restricts movement of the lever to a predetermined path but also makes it possible for the operator to sense more easily various levels of output of the transmission. The operator not only is given a reference point but the engagement of the lever with the sides of the slot helps to support the lever in selected positions which otherwise is difficult to maintain when the vehicle is operated on rough terrain.

A control apparatus for a hydrostatic transmission has been provided in which a single hand control lever is movable to control both the direction of output of a transmission and the speed of the transmission. The apparatus is manipulated by a hand control lever which, except for a guide plate providing a predetermined path of movement, would be movable infinitely in relatively large forward drive and rearward drive control ranges. The movement of the lever however, is confined to a predetermined path by which an operator may anticipate and sense different speed levels when the transmission is rotating in either its forward drive or reverse drive directions.

The embodiments of the invention in which an exclusive property or privilege is claimed are defined as follows:

1. A manually operated control arrangement for regulating a hydrostatic transmission of a vehicle drive system from a neutral operating condition to a selected forward or rearward driving condition and for varying the speed of operation in either of said forward or rearward driving conditions, the combination of; a control member supported for movement in opposite directions from a neutral point to a forward control range or to a reverse control range, said control member being movable vertically in a selected one of said ranges to vary the speed of drive of said transmission, a hand operated lever connected to said control member and being pivotal about a first axis to swing said control member into one of said ranges, said lever being pivotal about a second axis to move said control member vertically, a guide member coacting with said lever and defining a first path requiring movement of said lever into one of said the selected ranges while said control member is maintained vertically stationary and said transmission remains at zero speed, said lever being movable about said second axis from said first path into a selected one of a pair of paths to move said control member vertically and change the speed of said transmission.

2. The combination of claim 1 in which said hand operated lever is movable about said second axis a distance proportional to the distance of movement of said lever about said first axis from said neutral position.

3. The combination of claim 1 wherein said first path is disposed transversely to the direction of movement of said vehicle and said pair of paths extend longitudinally.

4. The combination of claim 3 in which said pair of paths each has a gate portion interupting movement of said lever longitudinally.

5. The combination of claim 4 in which said gates interupting movement of said lever require transverse movement of said lever to move through said gate.

6. The combination of claim 5 in which said gates in said forward range divide said path portion into at least three speed ranges.

7. The combination of claim 5 in which a gate in said reverse drive range divides said path portion into at least two speed ranges.

8. A control mechanism for controlling the direction of drive and the speed of a hydrostatic transmission; said transmission including an actuating member movable in opposite directions from a neutral position into a forward drive and a reverse drive range and being displacable in each of said ranges in proportion to the speed of the transmission, a shift element movable in opposite directions about a pivot axis, means connecting said shift element to said actuating member to move the latter in response to pivotal movement of said shift element, a guide slot in said shift element, a control member pivotal about one end and having its other end slidable in said slot, a hand operated lever movable about a first axis and connected to said control member to slide the latter in said slot in opposite directions from said pivot axis while said shift element remains stationary to determine the neutral position of said transmission, said hand operated lever being movable about a second axis when said control member is disposed to one side of said pivot axis to move said control member longitudinally and to pivot said shift element to determine the speed of said transmission.

9. The combination of claim 8 and further comprising guide means defining a predetermined path for confining movement of said hand operated lever, said predetermined path having a first portion permitting movement of said hand operated lever about said first axis to place said transmission in said neutral position and at zero speed and in a selected forward or reverse drive range, said predetermined path having a second and third portion disposed in said forward and reverse ranges respectively and intersecting said first portion for receiving said hand lever to determine the speed of said transmission in said selected forward or reverse speed range.

10. The combination of claim 9 wherein said second and third portions of said guide path have gate portions interrupting movement of said hand control lever between a zero speed and full speed position of said transmission.

11. The combination of claim 9 in which said guide slot is formed in an arc having its center at said first axis.

* * * * *